(12) United States Patent
Meng et al.

(10) Patent No.: US 12,347,190 B2
(45) Date of Patent: Jul. 1, 2025

(54) EFFICIENT OFFLOADING OF VIDEO FRAME PROCESSING TASKS IN EDGE-ASSISTED AUGMENTED REALITY

(71) Applicant: Charter Communications Operating, LLC, St. Louis, MO (US)

(72) Inventors: Jiayi Meng, West Lafayette, IN (US); Zhaoning Jonny Kong, West Lafayette, IN (US); Yu Charlie Hu, West Lafayette, IN (US); Mun Choi, Castle Pines, CO (US); Dhananjay Lal, Englewood, CO (US)

(73) Assignee: Charter Communications Operating, LLC, St. Louis, MO (US)

( * ) Notice: Subject to any disclaimer, the term of this patent is extended or adjusted under 35 U.S.C. 154(b) by 390 days.

(21) Appl. No.: 17/703,674

(22) Filed: Mar. 24, 2022

(65) Prior Publication Data

US 2023/0326204 A1    Oct. 12, 2023

(51) Int. Cl.
| | |
|---|---|
| *G06V 20/20* | (2022.01) |
| *G06T 7/20* | (2017.01) |
| *G06T 7/50* | (2017.01) |
| *G06T 7/70* | (2017.01) |
| *H04N 19/20* | (2014.01) |
| *H04N 19/597* | (2014.01) |
| *H04W 72/0446* | (2023.01) |

(52) U.S. Cl.
CPC ............ *G06V 20/20* (2022.01); *G06T 7/20* (2013.01); *G06T 7/50* (2017.01); *G06T 7/70* (2017.01); *H04N 19/20* (2014.11); *H04N 19/597* (2014.11); *H04W 72/0446* (2013.01); *G06T 2207/10016* (2013.01)

(58) Field of Classification Search
CPC .......... G06V 20/20; G06V 10/95; G06T 7/20; G06T 7/50; G06T 7/70; G06T 2207/10016; H04N 19/20; H04N 19/597; H04N 21/4728; H04N 21/8456; H04N 21/64784; H04N 21/816; H04W 72/0446
See application file for complete search history.

(56) References Cited

U.S. PATENT DOCUMENTS

| | | | | |
|---|---|---|---|---|
| 2009/0097764 A1* | 4/2009 | Sung | .................... | H04N 19/146 |
| | | | | 375/E7.2 |
| 2019/0356905 A1* | 11/2019 | Godard | .................... | G06T 7/73 |
| 2021/0110191 A1* | 4/2021 | Gruteser | ................ | G06N 3/045 |

OTHER PUBLICATIONS

ARCore, "Fundamental concepts", Last update 2022, Retrieved from internet: https://developers.google.com/ar/develop/fundamentals, 5 pages.

Barron et al. "Performance of optical flow techniques," International Journal of Computer Vision 12, 1 (1994), https://doi.org/10.1007/BF01420984, pp. 43-77.

(Continued)

*Primary Examiner* — Brandon J Miller
(74) *Attorney, Agent, or Firm* — Dority & Manning, P.A.

(57) ABSTRACT

An augmented reality (AR) device captures a first image frame of a first scene in a real world. The AR device compresses the first image frame using a same bitrate across an entirety of the first image frame to generate a first compressed image frame. The AR device wirelessly sends, to a server, the first compressed image frame. The AR device receives, from the server, object detection results that identify locations of objects depicted in the first image frame.

18 Claims, 8 Drawing Sheets

(56) References Cited

OTHER PUBLICATIONS

Liu et. al. "Edge Assisted Real-time Object Detection for Mobile Augmented Reality," The 25th Annual International Conference on Mobile Computing and Networking, https://doi.org/10.1145/3300061.3300116, Aug. 2019, pp. 1-16.

Meng et al. "Edge-assisted AR Design Made Simple: Video Encoding and Local Tracking are Enough," https://www.winlab.rutgers.edu/~gruteser/papers/mobicom19_augmented_reality.pdf, Purdue University, 2019, pp. 1-6.

Narayanan et al. "Lumos5G: Mapping and Predicting Commercial mmWave 5G Throughput" In Proceedings of the ACM Internet Measurement Conference, Oct. 2020, 18 pages.

Author Unknown, "Mobile AR market revenue worldwide 2021-2026", Retrieved from internet: /https://www.statista.com/statistics/282453/mobile-augmented-realitymarket-size/, Aug. 18, 2022, 3 pages.

Chen et al., "Glimpse: Continuous, Real-Time Object Recognition on Mobile Devices", In Proceedings of the 13th ACM Conference on Embedded Networked Sensor Systems, 2015, pp. 155-168.

Zhu et al., "Deep Feature Flow for Video Recognition", In Proceedings of the IEEE Conference on Computer Vision and Pattern Recognition, 2017, pp. 2349-2358.

Notice of Allowance and Notice of Allowability for U.S. Appl. No. 18/313,042, dated Mar. 27, 2025, 15 pages.

\* cited by examiner

EFFICIENT OFFLOADING OF VIDEO FRAME PROCESSING TASKS IN EDGE-ASSISTED AUGMENTED REALITY

BACKGROUND

Augmented reality (AR) is increasingly popular but can involve a substantial amount of processing power for AR tasks, such as object detection.

SUMMARY

The embodiments disclosed herein implement efficient offloading of image frame processing tasks in edge-assisted augmented reality.

In one embodiment a method is provided. The method includes capturing, by an augmented reality (AR) device, a first image frame of a first scene in a real world. The method further includes compressing, by the AR device, the first image frame using a same bitrate across an entirety of the first image frame to generate a first compressed image frame. The method further includes wirelessly sending, by the AR device to a server, the first compressed image frame. The method further includes receiving, by the AR device from the server, object detection results that identify locations of objects depicted in the first image frame.

In another embodiment a system is provided. The system includes an AR device comprising a display device, a first memory, and a first processor device coupled to the first memory, the first processor device being configured to capture a first image frame of a first scene in a real world. The first processor device is further configured to compress the first image frame using a same bitrate across an entirety of the first image frame to generate a first compressed image frame. The first processor device is further configured to wirelessly send, to a server, the first compressed image frame. The first processor device is further configured to receive, from the server, object detection results that identify locations of objects depicted in the first image frame.

In another embodiment a non-transitory computer-readable storage medium is provided. The non-transitory computer-readable storage medium includes executable instructions configured to cause a processor device to capture a first image frame of a first scene in a real world. The instructions further cause the processor device to compress the first image frame using a same bitrate across an entirety of the first image frame to generate a first compressed image frame. The instructions further cause the processor device to wirelessly send, to a server, the first compressed image frame. The instructions further cause the processor device to receive, from the server, object detection results that identify locations of objects depicted in the first image frame.

Those skilled in the art will appreciate the scope of the disclosure and realize additional aspects thereof after reading the following detailed description of the embodiments in association with the accompanying drawing figures.

BRIEF DESCRIPTION OF THE DRAWINGS

The accompanying drawing figures incorporated in and forming a part of this specification illustrate several aspects of the disclosure and, together with the description, serve to explain the principles of the disclosure.

DETAILED DESCRIPTION

Figure 1A:
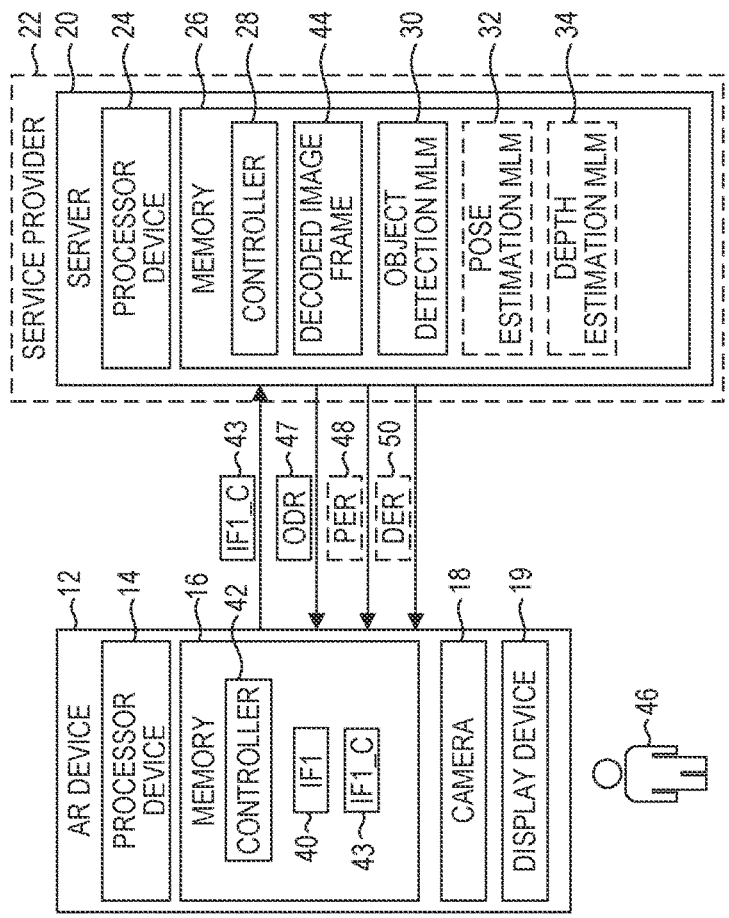
FIGS. 1A and 1B are block diagrams of an environment for implementing efficient offloading of image frame processing tasks in edge-assisted augmented reality (AR) at two points in time according to one embodiment.
Figure 1A:
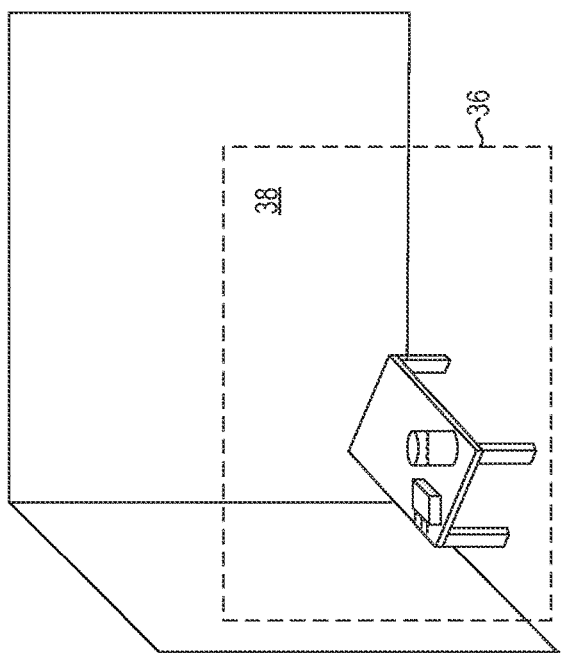

The embodiments set forth below represent the information to enable those skilled in the art to practice the embodiments and illustrate the best mode of practicing the embodiments. Upon reading the following description in light of the accompanying drawing figures, those skilled in the art will understand the concepts of the disclosure and will recognize applications of these concepts not particularly addressed herein. It should be understood that these concepts and applications fall within the scope of the disclosure and the accompanying claims.

Any flowcharts discussed herein are necessarily discussed in some sequence for purposes of illustration, but unless otherwise explicitly indicated, the embodiments are not limited to any particular sequence of steps. The use herein of ordinals in conjunction with an element is solely for distinguishing what might otherwise be similar or identical labels, such as "first message" and "second message," and does not imply a priority, a type, an importance, or other attribute, unless otherwise stated herein. The term "about" used herein in conjunction with a numeric value means any value that is within a range of ten percent greater than or ten percent less than the numeric value.

As used herein and in the claims, the articles "a" and "an" in reference to an element refers to "one or more" of the element unless otherwise explicitly specified. The word "or" as used herein and in the claims is inclusive unless contextually impossible. As an example, the recitation of A or B means A, or B, or both A and B. Augmented reality (AR) refers to the presentation of a combination of computer-generated imagery and a real-world scene to a user. AR devices can comprise computing tablets, smartphones, laptop devices, and any other portable computing device that has a camera and a display device. AR devices can also be head-mounted. A video see-through head-mounted AR device may have a display screen, such as a liquid crystal display (LCD) or organic light-emitting diode (OLED) display screen, that is positioned near the user's eyes. The head-mounted AR device presents a real-time camera feed of a scene in the real-world on the display screen and superimposes computer-generated imagery at certain locations on the display screen. An optical see-through head-mounted AR device has a transparent lens through which the viewer views the real world, and a reflective interior surface on which computer-generated imagery can be projected and reflected into the user's eyes.

Irrespective of the type of AR device, certain AR tasks are typically implemented to provide an immersive AR experience, including, by way of non-limiting example, object detection, pose estimation, and depth estimation. Object detection is the identification of objects in a scene viewed by a user. Pose estimation is an estimation of the pose of the user using the AR device, such as an orientation of the field of view (FOV) of the camera of the AR device, and depth estimation is the estimation of depths (Z-values), in a three-dimensional space, of pixels in an image frame.

Each of these AR tasks can play a role in providing a fluid, seamless, and immersive AR experience. Unfortunately, one or more of these AR tasks can require substantial processing power. As an example, object detection is typically performed by a machine learning model, such as a deep neural network (DNN), that requires sufficient processing power and computing resources to identify objects in an acceptable time frame. Many AR devices have relatively meager computing resources relative to the computing resources needed to perform object detection.

Image frames can be offloaded (i.e., transmitted) to a server that has sufficient processing capabilities and an object detection DNN. The server can perform object detection on the image frame and send the results back to the AR device. However, the combination of upload (UL) time, processing time, and download (DL) time typically results in the AR device receiving the object detection results several frames after the image frame was uploaded. The AR device must then use the object detection results of an image frame for several image frames while it awaits the results of the most recently uploaded image frame. As the user moves the field of view of the AR device, the object detection results become increasingly inaccurate, resulting in unrealistic AR imagery. For example, an AR object may inadvertently overlap a real-world object that should not be overlapped. This leads to user dissatisfaction.

The embodiments disclosed herein implement efficient offloading of image frame processing tasks in edge-assisted AR. The embodiments compress image frames prior to offloading the image frame to a server for one or more AR tasks. Object detection results are then received and utilized as another image frame is offloaded to the server for object detection. The embodiments, among other advantages, reduce the amount of time it takes to offload, process, and receive object detection results, and thus provide a more seamless and immersive AR experience to a user.

Figure 1B:
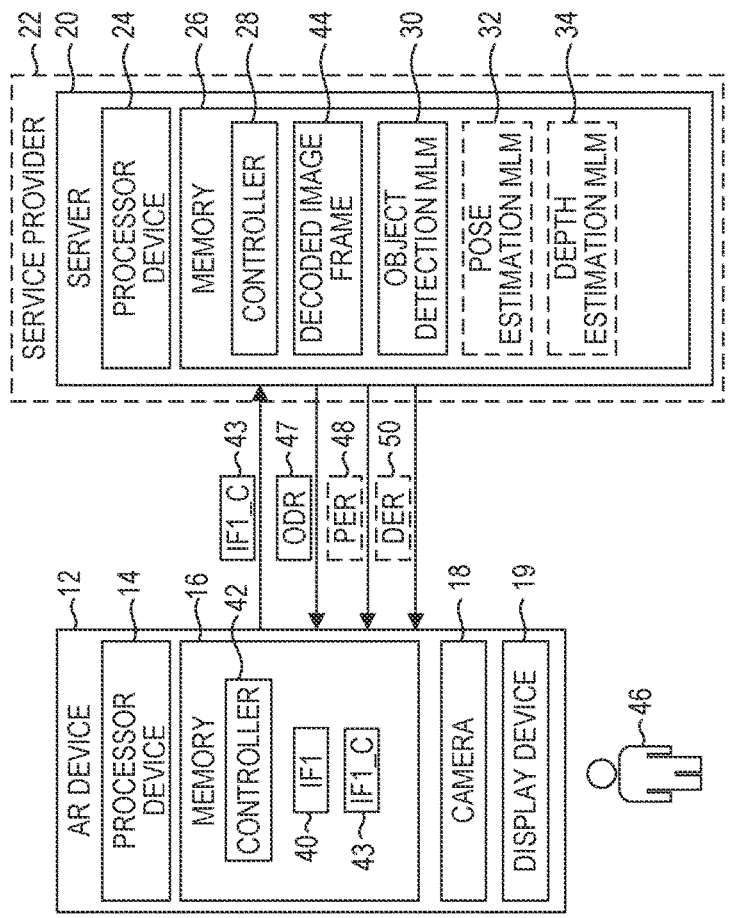
Figure 1B:
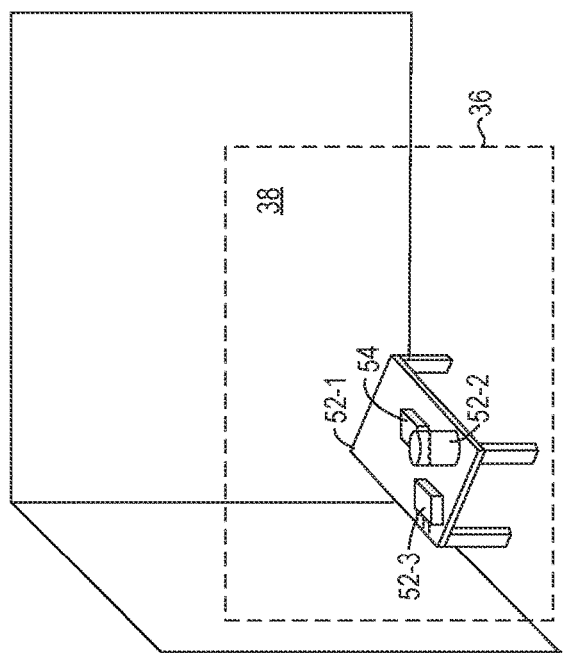

FIGS. 1A and 1B are block diagrams of an environment 10 for implementing efficient offloading of image frame processing tasks in edge-assisted AR at two points in time according to one embodiment. The environment 10 includes an AR device 12, which includes a processor device 14, a memory 16, a camera 18, and a display device 19. The AR device 12 may comprise any computing device capable of implementing AR, such as a computing tablet, a smartphone, a laptop computer, a video see-through head-mounted AR device, an optical see-through head-mounted AR device, or the like.

The AR device 12 wirelessly communicates with a server 20, which may be owned and operated by a service provider 22. In this embodiment, the server 20 is an edge server of a large network via which the service provider 22 provides services, such as video services, data services, and the like, to thousands or millions of customers. The AR device 12 may communicate with the server 20 via one or more intermediate devices, such as a wireless gateway router (not illustrated), that are coupled to the network of the service provider 22 via a communications medium such as a coaxial cable or fiber. In such an embodiment, the AR device 12 may be connected to a local area network implemented by the wireless gateway router that is a different network than the network to which the server 20 is connected. In other embodiments, the AR device 12 may communicate with the server 20 via intermediate telecommunications equipment, such as 4G or 5G telecommunications equipment.

The server 20 includes a processor device 24 and a memory 26. The server 20 includes a controller 28 and an object detection machine learning model (MLM) 30. In some embodiments, the server 20 may also include a pose estimation MLM 32 and a depth estimation MLM 34. The object detection MLM 30 is an MLM, such as a deep neural network (DNN), that has been trained to identify objects in an image frame and provide object detection results to the AR device 12. The AR device 12 can use the object detection results to, for example, determine the placement of AR imagery with respect to the objects. In some embodiments, the object detection results may be, for each detected object, a bounding box that comprises location information that identifies the location of one or more objects depicted in an image frame. In some embodiments, the object detection results comprise, for each detected object, four floating point values that define a rectangle (e.g., bounding box) in the image frame that encompasses the detected object, and a prediction confidence for the detected object.

The pose estimation MLM 32 is an MLM trained to identify, based on an image frame, the pose of the user, such as the orientation of the head of the user. The depth estimation MLM 34 is an MLM trained to generate, based on an image frame, a depth map that contains a depth value for each pixel in the image frame.

The camera 18 has a field of view (FOV) that defines the scene that is captured in an image frame of the camera 18. The exact scene that is captured changes as a user 46 moves the FOV in the real world. The term "frame" as used herein refers to an interval of time. The term "image frame" as used herein refers to the scene captured by the camera 18 for a particular frame. The interval of time of a frame may differ from camera to camera. For example, each frame is 16.7 milliseconds for a camera operating at a 60 frames per second (FPS) framerate. As another example, each frame is 33.4 milliseconds for a camera operating at a 30 FPS framerate. Each frame, the camera 18 captures an image at the particular resolution of the camera 18. The resolution may be, for example, HD, 4K, or any other resolution. The greater the resolution, the greater the amount of data of the image, and the longer it will take to offload the image frame given a constant network bandwidth. The terms "offload" and "offloading" refer to the transfer of an image frame from the AR device 12 to the server 20.

As an example of implementing efficient offloading of image frame processing tasks in edge-assisted AR, assume that the user 46 manipulates the AR device 12 such that an FOV 36 of the camera 18 encompasses a scene 38. The camera 18 operates at a 60 FPS framerate. The camera 18 generates an image frame 40. The image frame 40 comprises the image data generated by, for example, a charge-coupled device (CCD) or other sensor of the camera 18 at the resolution of such CCD or other sensor.

A controller 42 compresses (e.g., encodes) the image frame 40 using a same bitrate across an entirety of the image frame 40 to generate a compressed image frame 43. The controller 42 may use any suitable compression algorithm, such as an H.264 encoding algorithm or the like. The compressed image frame 43 may include the particular encoding parameters, such as bitrate and frame resolution.

The controller 42 offloads, e.g., transmits, the compressed image frame 43 to the server 20.

In some embodiments, the controller 42 may use a pre-trained light-weight neural network MLM to determine the encoding parameters, such as, by way of non-limiting example, bitrate and/or frame resolution. In one embodiment, such a light-weight neural network includes 53 convolutional layers followed by 2 fully connected layers, each of which contains 20 neurons. The neural network first accepts the image frame as the input to the convolutional layers and outputs a vector of features related to the frame content. The neural network then feeds the vector of content-related features together along with network bandwidth as the input to the fully connected layers. The neural network outputs a probability distribution of bitrate and frame resolution predicted for the current frame. The controller 42 then selects the bitrate and frame resolution with the highest probability as the encoding parameters.

The controller 28 receives the compressed image frame 43 and decodes the compressed image frame 43 to generate a decoded image frame 44. The controller 28 inputs the decoded image frame 44 into the object detection MLM 30 and sends (i.e., downloads) object detection results 47 generated by the object detection MLM 30 to the AR device 12. If the server 20 is also performing pose estimation and/or depth estimation, the controller 28 inputs the decoded image frame 44 into the pose estimation MLM 32 and the depth estimation MLM 34. The controller 28 sends (i.e., downloads) pose estimation results 48 and depth estimation results 50 to the AR device 12.

The controller 28 may input the decoded image frame 44 into the pose estimation MLM 32 and the depth estimation MLM 34 in parallel, or sequentially, depending on the processing power of the server 20. In an embodiment wherein the server 20 has sufficient processing power and memory, the object detection MLM 30, the pose estimation MLM 32, and the depth estimation MLM 34 may all be provided with the decoded image frame 44 substantially concurrently and process the decoded image frame 44 concurrently. In an embodiment wherein the server 20 has insufficient processing power and memory for concurrent processing, the object detection MLM 30, the pose estimation MLM 32, and the depth estimation MLM 34 may be provided with the decoded image frame 44 sequentially.

The AR device 12 receives the object detection results 47. As will be discussed in greater detail below, in some embodiments, wherein the upload time of the compressed image frame 43, the processing time of the server 20, and the download time of the object detection results 47 are greater than a frame, in some embodiments the AR device 12 may generate another compressed image frame and offload the compressed image frame to the server 20 for AR task processing prior to receiving the object detection results 47.

Referring now to FIG. 1B, the AR device 12 may use the object detection results 47 for AR object placement. In this example, the object detection results 47 include three bounding boxes that identify objects 52-1, 52-2 and 52-3 depicted in the decoded image frame 44. In this example, the AR device 12 generates an AR object 54 and presents the AR object 54 in conjunction with the real-world scene 38 to the user 46 on the display device 19. The AR device 12 depicts the AR object 54 as being partially occluded by the object 52-2 based on the object detection results 47.

It is noted that, because the controller 42 is a component of the AR device 12, functionality implemented by the controller 42 may be attributed to the AR device 12 generally. Moreover, in examples where the controller 42 comprises software instructions that program the processor device 14 to carry out functionality discussed herein, functionality implemented by the controller 42 may be attributed herein to the processor device 14.

Further, it is noted that, because the controller 28 is a component of the server 20, functionality implemented by the controller 28 may be attributed to the server 20 generally. Moreover, in examples where the controller 28 comprises software instructions that program the processor device 24 to carry out functionality discussed herein, functionality implemented by the controller 28 may be attributed herein to the processor device 24.

Figure 2:
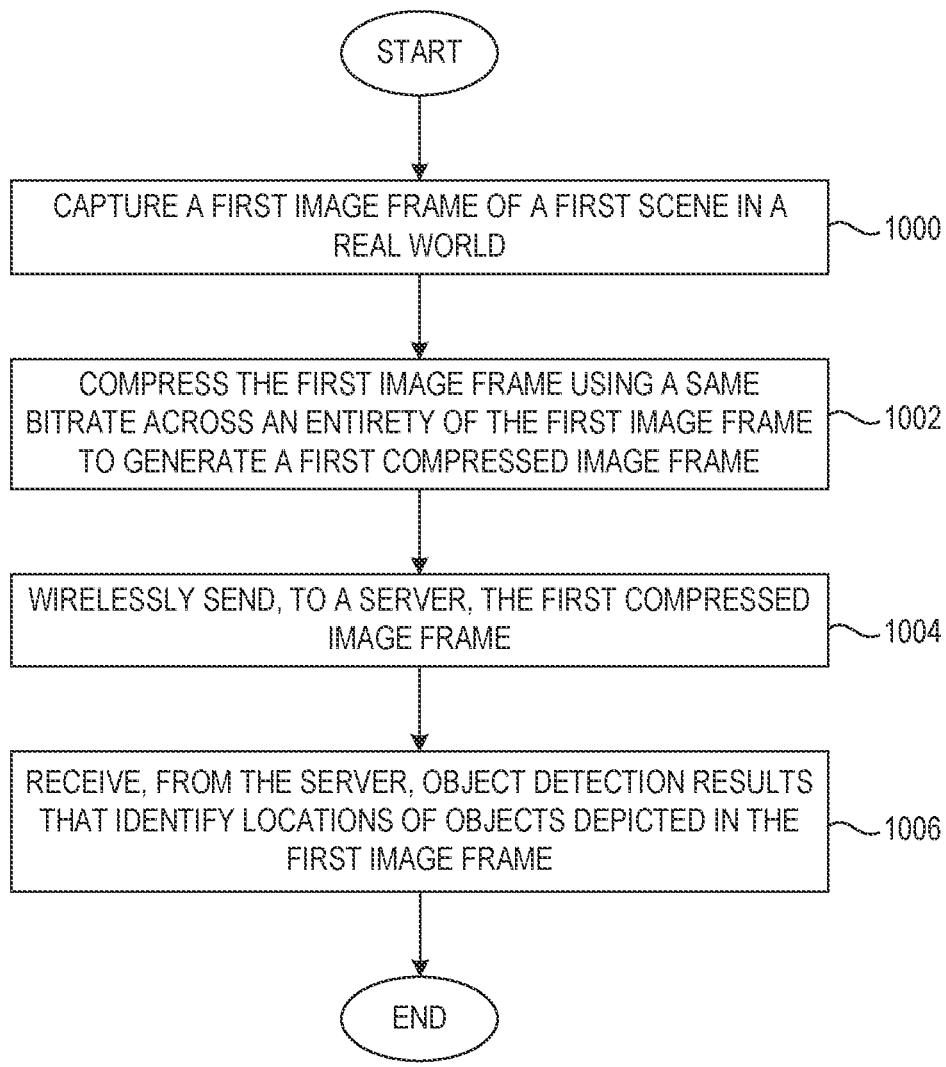
FIG. 2 is a flowchart of a method for implementing efficient offloading of image frame processing tasks in edge-assisted AR from the perspective of an AR device according to one embodiment.

FIG. 2 is a flowchart of a method for implementing efficient offloading of image frame processing tasks in edge-assisted AR from the perspective of an AR device according to one embodiment. FIG. 2 will be discussed in conjunction with FIGS. 1A and 1B. The AR device 12 captures the image frame 40 of the scene 38 in the real world (FIG. 2, block 1000). The AR device 12 compresses the image frame 40 using a same bitrate across an entirety of the image frame 40 to generate the compressed image frame 43 (FIG. 2, block 1002). The AR device 12 wirelessly sends, to the server 20, the compressed image frame 43 (FIG. 2, block 1004). The AR device 12 receives, from the server 20, the object detection results 47 that identify locations of the objects 52-1-52-3 depicted in the image frame 40 (FIG. 2, block 1006).

Figure 3:
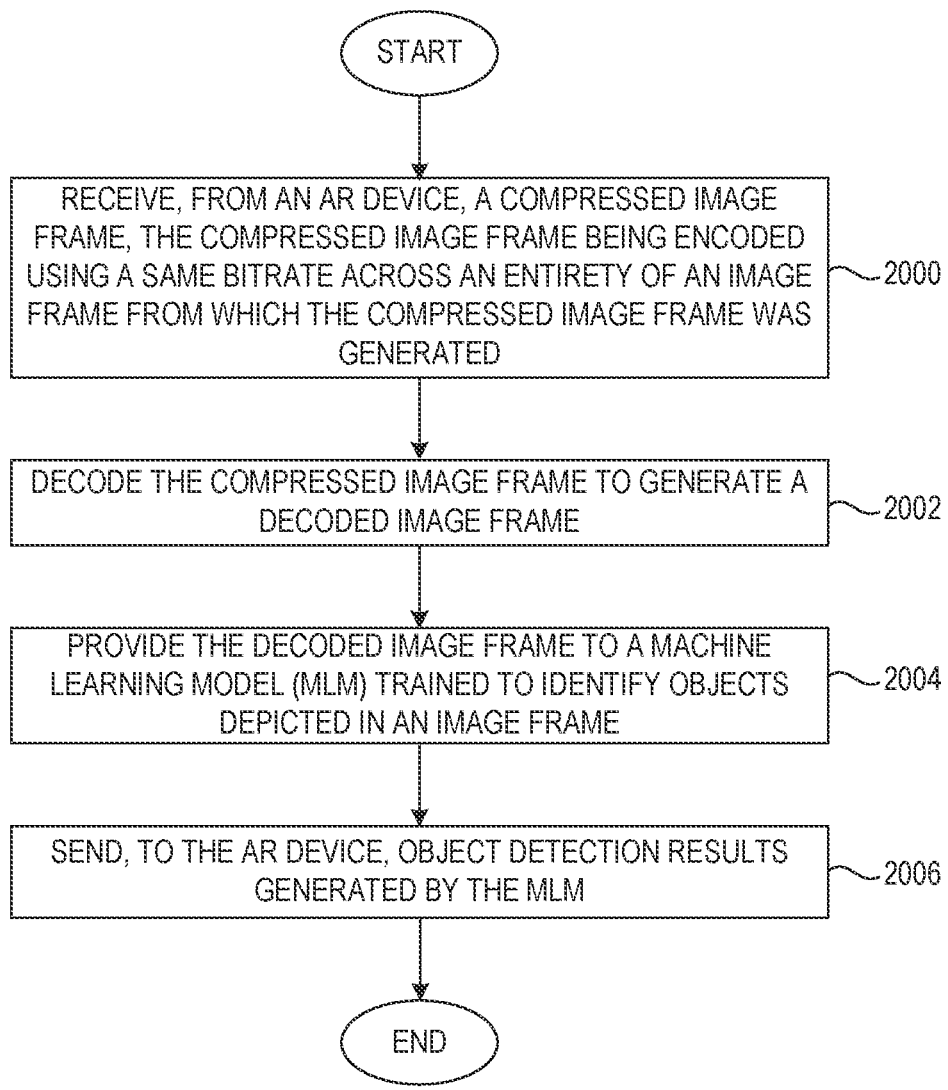
FIG. 3 is a flowchart of a method for implementing efficient offloading of image frame processing tasks in edge-assisted AR from the perspective of a server according to one embodiment.

FIG. 3 is a flowchart of a method for implementing efficient offloading of image frame processing tasks in edge-assisted AR from the perspective of a server according to one embodiment. FIG. 3 will be discussed in conjunction with FIGS. 1A and 1B. The server 20 receives, from the AR device 12, the compressed image frame 43, the compressed image frame 43 being encoded using a same bitrate across an entirety of the image frame 40 from which the compressed image frame 43 was generated (FIG. 3, block 2000). The server 20 decodes the compressed image frame 43 to generate the decoded image frame 44 (FIG. 3, block 2002). The server 20 provides the decoded image frame 44 to the object detection MLM 30 trained to identify objects depicted in the image frame 40 (FIG. 3, block 2004). The server 20 sends, to the AR device 12, the object detection results 47 generated by the object detection MLM 30 (FIG. 3, block 2006).

In some embodiments, the AR device 12 determines an offloading periodic frame position (sometimes referred to herein as an offloading interval) that identifies a periodic frame position of image frames that are to be provided to the server 20. The AR device 12 may determine the offloading periodic frame position where the sum of the network upload (UL) time to offload an image frame to the server 20, the processing time of the server 20, and the network download (DL) time to download the object detection results from the server 20 to the AR device 12 is greater than a frame interval. In such circumstances, it may be more efficient to only upload certain image frames to the server 20 rather than each image frame to the server 20. The AR device 12 may then use the object detection results from an image frame for several image frames. The AR device 12 may use heuristic fast tracking methods, such as, by way of non-limiting example, an optical flow estimation process such as the Lucas-Kanade optical flow estimation process, to determine the locations of objects in the current image frames taken in between receiving object detection results from successive offloaded image frames. Because the accuracy of such heuristic fast tracking methods may decrease with time as the FOV of the AR device 12 encompasses new scenes in the real world, it is desirable to determine an optimal offloading periodic frame position such that updated object detection results can be obtained in a shortest time interval. Thus, the AR device 12, subsequent to receiving the object detection results may then capture a plurality of successive image frames prior to receiving the next object detection results from the server 20. The AR device 12, for each respective successive image frame of the plurality of successive image frames, may then track, using a local tracking algorithm and the object detection results, movement of the objects depicted in the first image frame to derive current object detection results for the respective successive image frame.

Figure 4:
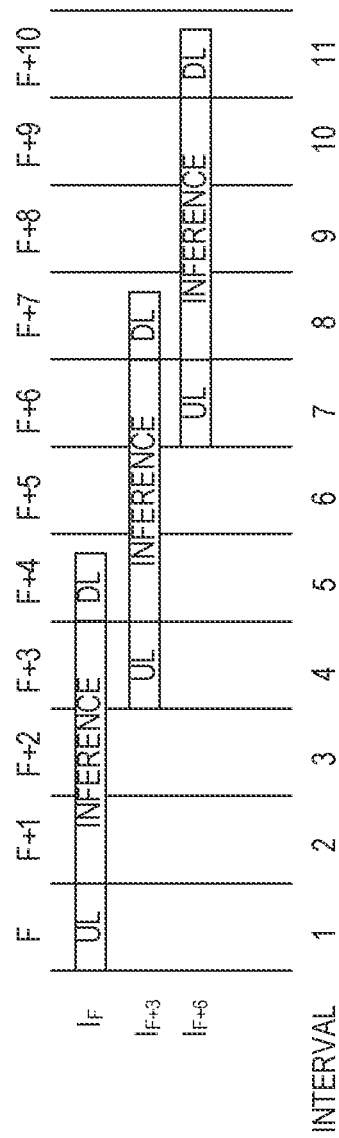
FIG. 4 is a diagram illustrating an example of inference-dominant offloading, wherein the processing delay of a server, sometimes referred to as inference latency, is greater than the sum of the network transmission delay.

Because the AR device 12 may not be able to concurrently offload an image frame and download object detection results, the optimal offloading periodic frame position may differ depending on time intervals associated with uploading an image frame, the processing time of an image frame by the server 20, and the downloading of object detection results. FIG. 4 illustrates inference-dominant offloading, wherein the processing time of the server 20, sometimes referred to as inference latency, or processor delay, is greater than the sum of the network transmission delay, as reflected in the following formula:

$$T_{inf} > T_{ul} + T_{dl}$$

wherein $T_{inf}$ is the inference latency of the server 20, $T_{ul}$ is the network transmission delay of offloading a compressed image to the server 20, and $T_{dl}$ is the network transmission delay of downloading the object detection results from the server 20 to the AR device 12.

The values of $T_{inf}$, $T_{ul}$, $T_{dl}$ may be determined and stored as configuration data, determined in real time via communications between the AR device 12 and the server 20, or determined in any other suitable manner. FIG. 4 illustrates a series of eleven successive frames 56 labelled F–F+10. In this example, each frame 56 is a 16.7 ms interval, corresponding to a 60 FPS framerate of the camera 18 (FIG. 1A). In the case of inference-dominant offloading, image frames can be "pipelined" such that an image frame can be offloaded prior to receiving the object detection results from a previously offloaded image frame without affecting the per-frame end-to-end offloading delay because the uploading of the image frame does not overlap the downloading of object detection results. At a frame F, a current image frame IF captured by the camera 18 is uploaded (i.e., offloaded) to the server 20. The uploading takes the frame F. Subsequently, while the server 20 is processing the image frame IF during frames F+1, F+2, and F+3, the image frame $I_{F+3}$ can be offloaded at frame F+3 without overlapping with the downloading of the object detection results of the image frame $I_F$ at F+4. Thus, in this example, the AR device 12 determines an offloading frame position (e.g., periodic frame position) of three, such that each image frame that corresponds to every third frame position is offloaded by the AR device 12 to the server 20. Thus, the periodic frame position of frames is such that an image frame corresponding to the periodic frame position is uploaded prior to a completion of processing by the server 20 of a previously sent compressed image frame. Note that the image frames that correspond to frame positions other than every third frame position are not offloaded to the server 20. In inference-dominant offloading, the maximum offloading frequency may be determined by the per-frame inference duration on the server 20 in accordance with the following formula:

$$f = \left(\frac{T_{inf}}{T_{frame}}\right)^{-1}$$

wherein $T_{frame}$ is the frame interval, in this example, 16.7 ms.

Figure 5A:
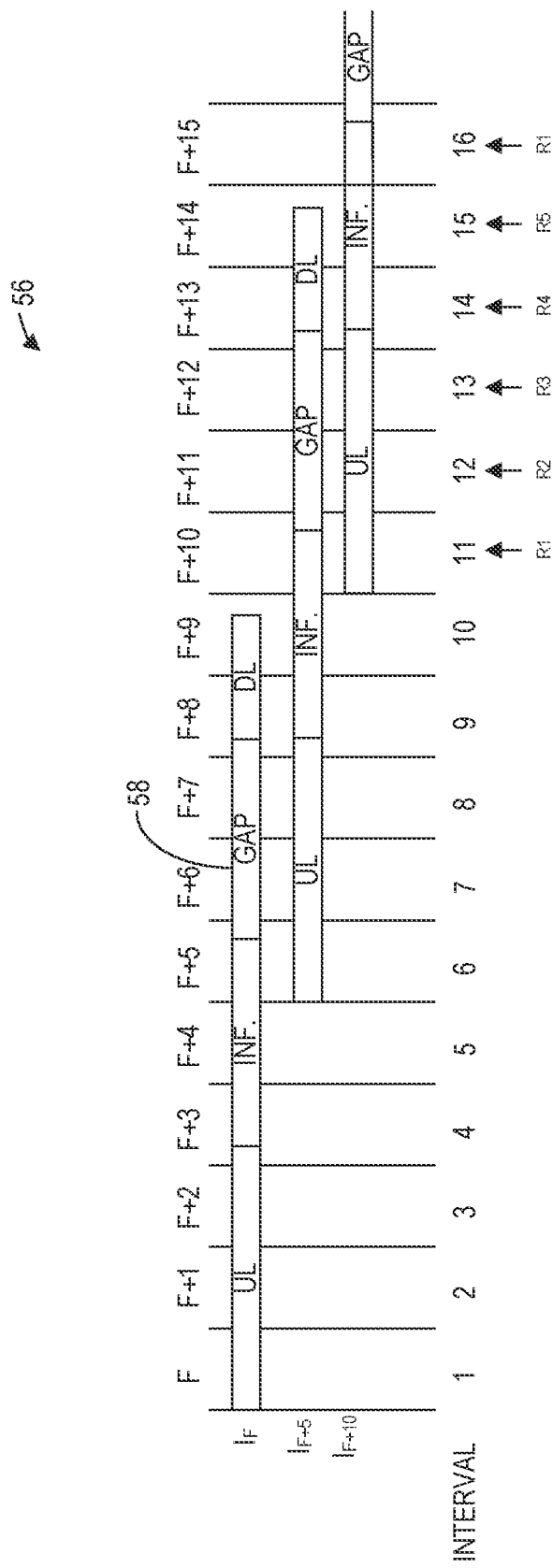
FIGS. 5A and 5B are diagrams illustrating examples of network-dominant offloading, wherein the network transmission delay exceeds the processing delay of the server.
Figure 5B:
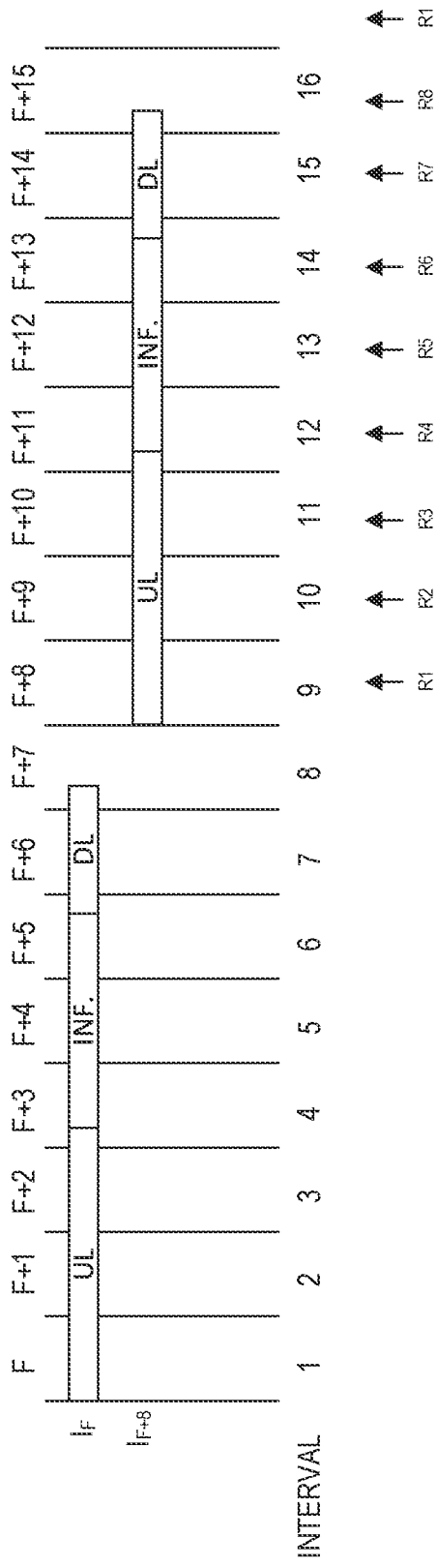

FIGS. 5A and 5B illustrate examples of network-dominant offloading, wherein the network transmission delay exceeds the processing delay of the server 20, such that $T_{ul} + T_{dl} = T_{inf}$. FIG. 5A illustrates a series of sixteen successive frames 56 labelled F–F+15. Again, in this example, each frame 56 is a 16.7 ms interval, corresponding to a 60 FPS framerate of the camera 18 (FIG. 1A). In a network-dominant offloading situation, the AR device 12 may determine an offloading frame position based on a frame reuse value that identifies a number of image frames that utilize the object detection results of a previously compressed image frame. The AR device 12 may determine an offloading frame position that results in a smallest frame reuse value. In FIG. 5A, at the frame F, a current compressed image frame IF captured by the camera 18 is uploaded (i.e., offloaded) to the server 20. The upload time includes frames F, F+1, F+2, and a portion of F+3. The inference time of the server (INF) takes a portion of F+3, all of F+4, and a portion of F+5. At frame F+5, the AR device 12 begins uploading the compressed image frame F+5. This may be referred to as a pipelined offloading schedule because a compressed image frame is uploaded to the server 20 prior to receiving the object detection results of the previous uploaded compressed image. Because the upload of the compressed image frame $I_{F+5}$ takes frames F+5, F+6, F+7, and a portion of F+8, the server 20 has a gap 58 during which the object detection results of the compressed image frame IF are not sent to the AR device 12 because of the upload of the compressed image frame $I_{F+5}$.

After the upload of the compressed image frame $I_{F+5}$, the object detection results of the compressed image frame IF are downloaded to the AR device 12. If it is assumed that the object detection results can be first utilized in the frame subsequent to receiving the object detection results, the object detection results of the compressed image frame IF are used by the AR device 12 for the image frames $I_{F+10}$-$I_{F+14}$ for a frame reuse value of five. Thus, the object detection results of a compressed image frame are used for five subsequent image frames. The offloading frame position (e.g., periodic frame position) in this example is five, such that every fifth image frame is compressed and offloaded to the server 20.

FIG. 5B illustrates the same uploading time, inference delay, and download time as that illustrated in FIG. 5A, but FIG. 5B illustrates a non-pipelined offloading schedule. Again, in this example, each frame 56 is a 16.7 ms interval, corresponding to a 60 FPS framerate of the camera 18 (FIG. 1A). At the frame F, a current compressed image frame IF captured by the camera 18 is uploaded (i.e., offloaded) to the server 20. The upload time includes frames F, F+1, F+2, and a portion of F+3. The inference time of the server (INF) takes a portion of F+3, all of F+4, and a portion of F+5. Also at frame F+5, the server 20 begins downloading the object detection results of the compressed image frame $I_F$ to the AR device 12. The AR device 12 utilizes the object detection results beginning at frame F+8. At frame F+8, the AR device 12 begins to upload the frame $I_{F+8}$ to the server 20. The AR device 12 can utilize the object detection results of the compressed image frame IF for the image frames $I_{F+8}$-$I_{F+15}$ for a frame reuse value of eight. Thus, the object detection results of a compressed image frame are used for eight subsequent image frames prior to receiving the object detection results from the most recent previously uploaded compressed frame image. The offloading frame position (e.g., periodic frame position) in this example is eight, such that every eighth image frame is compressed and offloaded to the server 20.

In this example, because the pipelined offloading schedule illustrated in FIG. 5A has a smaller frame reuse value of five compared to the non-pipelined offloading schedule illustrated in FIG. 5B that has a larger reuse value of eight, the AR device 12 chooses the pipelined offloading schedule and determines the offloading frame position to be five, such that every fifth image frame is compressed and offloaded to the server 20.

Thus, to stably pipeline network-dominant offloading, the total duration of the gap and inference should equal that of uplink and downlink transmission for each frame, i.e., $T_{gap}+T_{inf} > T_{ul}+T_{dl}$, where $T_{gap}$ is the duration of the gap, and the maximum offloading frequency f is determined by the total network transmission duration for a single frame, i.e., $$f = \left(\frac{T_{ul} + T_{dl}}{T_{frame}}\right)^{-1}.$$

However, pipelining network transmission and server inference in this way in network-dominant offloading can result in elongated end-to-end offloading delay, by $T_{gap}$. An alternative offloading schedule, simply offloading without pipelining, achieves the lowest possible per-offloading end-to-end delay of $T_{ul}+T_{inf}+T_{dl}$, as shown in FIG. 5B, which also dictates its maximum offloading frequency to be $$f = \left(\frac{T_{ul} + T_{inf} + T_{dl}}{T_{frame}}\right)^{-1}.$$

Figure 6:
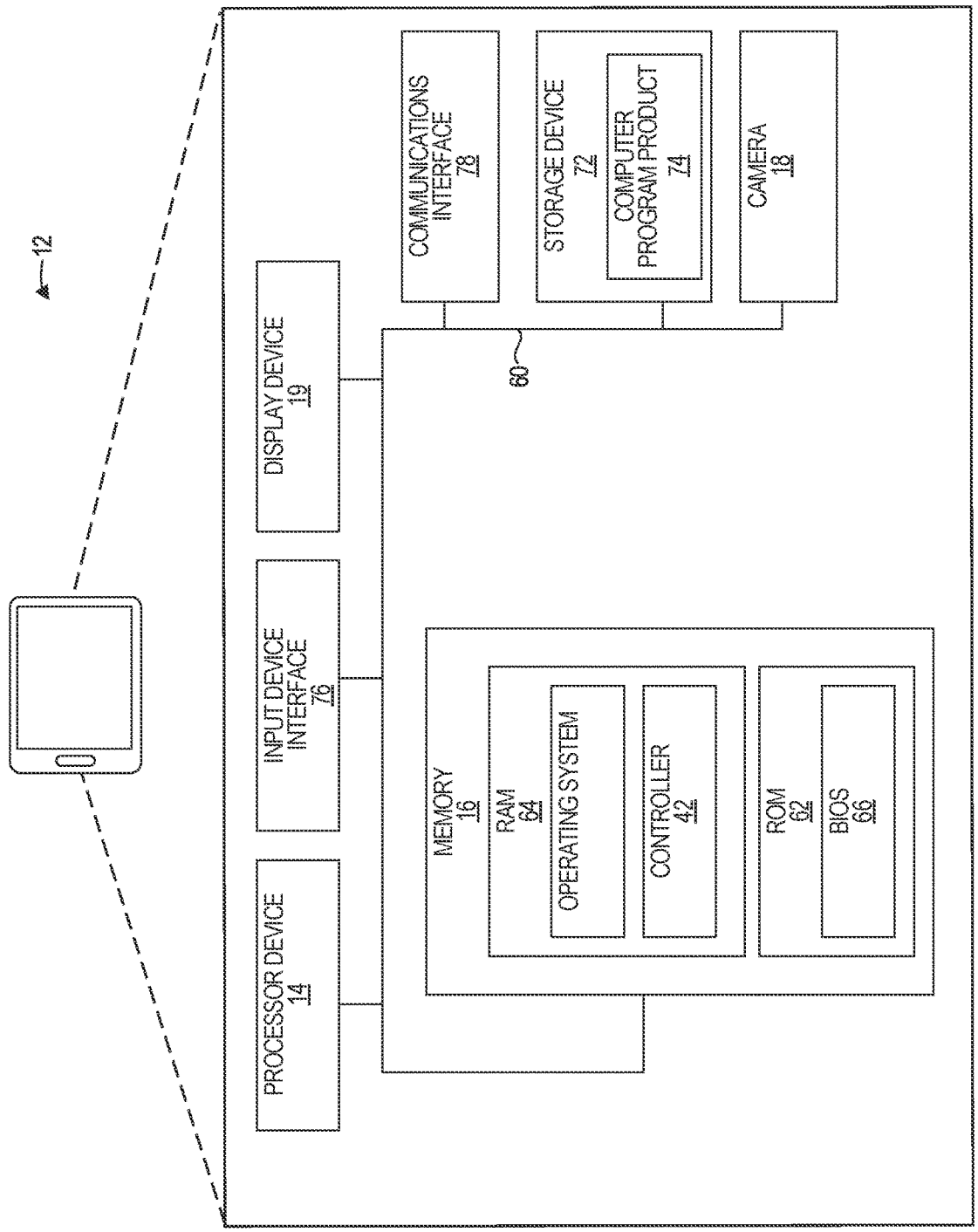
FIG. 6 is a block diagram of an AR device according to one embodiment.

FIG. 6 is a block diagram of the AR device 12 suitable for implementing examples according to one example. The AR device 12 includes the processor device 14, the memory 16, and a system bus 60. The system bus 60 provides an interface for system components including, but not limited to, the memory 16 and the processor device 14. The processor device 14 can be any commercially available or proprietary processor.

The system bus 60 may be any of several types of bus structures that may further interconnect to a memory bus (with or without a memory controller), a peripheral bus, and/or a local bus using any of a variety of commercially available bus architectures. The memory 16 may include non-volatile memory 62 (e.g., read-only memory (ROM), erasable programmable read-only memory (EPROM), electrically erasable programmable read-only memory (EEPROM), etc.), and volatile memory 64 (e.g., random-access memory (RAM)). A basic input/output system (BIOS) 66 may be stored in the non-volatile memory 62 and can include the basic routines that help to transfer information between elements within the AR device 12. The volatile memory 64 may also include a high-speed RAM, such as static RAM, for caching data.

The AR device 12 may further include or be coupled to a non-transitory computer-readable storage medium such as a storage device 72, which may comprise, for example, an internal or external hard disk drive (HDD) (e.g., enhanced integrated drive electronics (EIDE) or serial advanced technology attachment (SATA)), HDD (e.g., EIDE or SATA) for storage, flash memory, or the like. The storage device 72 and other drives associated with computer-readable media and computer-usable media may provide non-volatile storage of data, data structures, computer-executable instructions, and the like. Although the description of computer-readable media above refers to an HDD, it should be appreciated that other types of media that are readable by a computer, such as Zip disks, magnetic cassettes, flash memory cards, cartridges, and the like, may also be used in the operating environment, and, further, that any such media may contain computer-executable instructions for performing novel methods of the disclosed examples.

A number of modules can be stored in the storage device 72 and in the volatile memory 64, including an operating system and one or more program modules, such as the controller 42, which may implement the functionality described herein in whole or in part. All or a portion of the examples may be implemented as a computer program product 74 stored on a transitory or non-transitory computer-usable or computer-readable storage medium, such as the storage device 72, which includes complex programming instructions, such as complex computer-readable program code, to cause the processor device 14 to carry out the steps described herein. Thus, the computer-readable program code can comprise software instructions for implementing the functionality of the examples described herein when executed on the processor device 14. The processor device 14, in conjunction with the controller 42 in the volatile memory 64, may serve as a controller, or control system, for the AR device 12 that is to implement the functionality described herein.

An operator, such as the user 46, may also be able to enter one or more configuration commands through an input button or buttons, or a touch-sensitive surface such as the display device 19. Such input devices may be connected to the processor device 14 through an input device interface 76 that is coupled to the system bus 60 but can be connected by other interfaces such as a parallel port, an Institute of Electrical and Electronic Engineers (IEEE) 1394 serial port, a Universal Serial Bus (USB) port, an IR interface, and the like. The AR device 12 also includes the camera 18, and one or more communications interfaces 78 suitable for communicating with a network, such as a Wi-Fi® transceiver and/or a 4G or 5G transceiver.

Those skilled in the art will recognize improvements and modifications to the preferred embodiments of the disclosure. All such improvements and modifications are considered within the scope of the concepts disclosed herein and the claims that follow.

What is claimed is:

1. A method comprising:
   determining, by an augmented reality (AR) device, an offloading frame position that identifies a periodic frame position of a series of successive frame positions, wherein each image frame corresponding to the periodic frame position is compressed and sent to a server and each image frame corresponding to a frame position other than the periodic frame position is not compressed or sent to the server; capturing, by the AR device, a first image frame of a first scene in a real world; determining that the image frame corresponds to the periodic frame position; compressing, by the AR device, the first image frame using a same bitrate across an entirety of the first image frame to generate a first compressed image frame; wirelessly sending, by the AR device to the server, the first compressed image frame; and receiving, by the AR device from the server, object detection results that identify locations of objects depicted in the first image frame.

2. The method of claim 1 wherein the object detection results comprise a plurality of bounding boxes, each bounding box comprising location information that identifies a location of an object depicted in the first image frame.

3. The method of claim 2 further comprising:
depicting, by the AR device on a display device, an AR object that is at least partially occluded by an object in the real world based on at least one bounding box of the plurality of bounding boxes.

4. The method of claim 1 comprising:
capturing, over a period of time, a plurality of image frames of a scene in the real world; and
for each periodic frame position of a plurality of periodic frame positions that occurred over the period of time:
compressing, by the AR device, a respective image frame of the plurality of image frames that corresponds to the periodic frame position using the same bitrate across an entirety of the respective image frame to generate a respective compressed image frame;
wirelessly sending, by the AR device to the server, the respective compressed image frame; and
receiving, by the AR device, object detection results that identify locations of objects depicted in the respective compressed image frame.

5. The method of claim 1 further comprising receiving, by the AR device, pose estimation information based on the first compressed image frame that identifies a pose of a user using the AR device.

6. The method of claim 1 further comprising receiving, by the AR device, depth estimation information that corresponds to the first image frame, the depth estimation information identifying depths, in a three-dimensional space, of pixels of the first image frame.

7. The method of claim 1 wherein compressing the first image frame comprises compressing the first image frame using an H.264 encoding algorithm.

8. The method of claim 1 wherein determining the offloading frame position further comprises:
determining, by the AR device, that a processing time of the server is greater than a network transmission delay defined by a sum of an upload time that it takes to upload the first compressed image frame and a download time that is takes to download the object detection results; and
in response to determining that the processing time is greater than the network transmission delay, determining the offloading frame position to be the periodic frame position of frames such that an image frame corresponding to the periodic frame position is compressed and uploaded prior to a completion of processing by the server of a previously sent compressed image frame.

9. The method of claim 1 wherein determining the offloading frame position further comprises:
determining, by the AR device, that a processing time of the server is greater than a network transmission delay defined by a sum of an upload time that it takes to upload the first compressed image frame and a download time that is takes to download the object detection results; and
in response to determining that the processing time is greater than the network transmission delay, determining an offloading frame position f in accordance with:
f=(Tinf/Tframe)−1, wherein Tframe is a per-frame interval and $T_{inf}$ is the processing time of a compressed image frame by the server.

10. The method of claim 1 wherein determining the offloading frame position further comprises:
determining, by the AR device, a first frame reuse value that identifies a number of image frames that utilize the object detection results of a previously compressed image frame based on a first offloading frame position wherein a next compressed image frame is sent to the server prior to receiving the object detection results of the previously compressed image frame;
determining, by the AR device, a second frame reuse value that identifies a number of image frames that utilize the object detection results of a previously compressed image frame based on a second offloading frame position wherein a next compressed image frame is sent to the server after receiving the object detection results of the previously compressed image frame; and
wherein the offloading frame position is set to either the first offloading frame position or the second offloading frame position based on the smaller of the first frame reuse value or the second frame reuse value.

11. The method of claim 1 further comprising:
receiving, by the server, the first compressed image frame;
decoding, by the server, the first compressed image frame to generate a decoded image frame;
determining, by the server, the object detection results based on the decoded image frame; and
sending, by the server, the object detection results to the AR device.

12. The method of claim 1 further comprising:
subsequent to receiving the object detection results:
capturing a plurality of successive image frames prior to receiving a next object detection results from the server; and
for each respective successive image frame of the plurality of successive image frames, tracking, by the AR device, using a local tracking algorithm and based on the object detection results, movement of the objects depicted in the first image frame to derive current object detection results for the respective successive image frame.

13. A system comprising:
An augmented reality (AR) device comprising:
a display device; a first memory; and a first processor device coupled to the first memory, the first processor device being configured to: determine an offloading frame position that identifies a periodic frame position of a series of successive frame positions, wherein each image frame corresponding to the periodic frame position is compressed and sent to a server and each image frame corresponding to a frame position other than the periodic frame position is not compressed or sent to the server; capture a first image frame of a first scene in a real world; determine that the image frame corresponds to the periodic frame position; compress the first image frame using a same bitrate across an entirety of the first image frame to generate a first compressed image frame; wirelessly send, to the server, the first compressed image frame; and receive, from the server, object detection results that identify locations of objects depicted in the first image frame.

14. The system of claim 13 wherein the object detection results comprise a plurality of bounding boxes, each bounding box comprising location information that identifies a location of an object depicted in the first image frame.

15. The system of claim 13 wherein the first processor device is further configured to:
- capture, over a period of time, a plurality of image frames of a scene in the real world; and
- for each respective periodic frame position of the series of successive frame positions that occurred over the period of time:
  - compress an image frame of the plurality of image frames that corresponds to the respective periodic frame position using the same bitrate across an entirety of the respective image frame to generate a respective compressed image frame;
  - wirelessly send, to the server, the respective compressed image frame; and
  - receive object detection results that identify locations of objects depicted in the respective compressed image frame.

16. The system of claim 13 further comprising:
the server comprising:
- a second memory; and
- a second processor device coupled to the second memory, the second processor device being configured to:
  - receive the first compressed image frame;
  - decode the first compressed image frame to generate a decoded image frame;
  - determine the object detection results based on the decoded image frame; and
  - send the object detection results to the AR device.

17. The system of claim 16, wherein the second processor device is further configured to:
- extract, from the first compressed image frame, an encoding parameter; and
- wherein, to decode the first compressed image frame, the second processor device is further configured to decode the first compressed image frame using the encoding parameter.

18. A non-transitory computer-readable storage medium that includes executable instructions configured to cause a processor device of an augmented reality (AR) device to:
- determine an offloading frame position that identifies a periodic frame position of a series of successive frame positions, wherein each image frame corresponding to the periodic frame position is sent to a server and each image frame corresponding to a frame position other than the periodic frame position is not sent to the server;
- capture an image frame of a scene in a real world;
- determine that the image frame corresponds to the periodic frame position;
- compress the image frame to generate a compressed image frame;
- wirelessly send, to the server, the compressed image frame; and
- receive, from the server, object detection results that identify locations of objects depicted in the image frame.

* * * * *